United States Patent [19]
McLeod

[11] Patent Number: 5,684,274
[45] Date of Patent: Nov. 4, 1997

[54] ENCLOSURE FOR CABLE SPLICE ASSEMBLY

[75] Inventor: Robert J. McLeod, Markham, Canada

[73] Assignee: KMD Technologies, Inc., Markham, Canada

[21] Appl. No.: 567,371

[22] Filed: Dec. 4, 1995

[51] Int. Cl.$^6$ .................... H02G 15/08; H02G 15/113
[52] U.S. Cl. ........................... 174/92; 174/138 F
[58] Field of Search ................ 174/92, 93, 138 F, 174/74 A, 77 R

[56] References Cited

U.S. PATENT DOCUMENTS

| | | | |
|---|---|---|---|
| 3,183,302 | 5/1965 | Wochner et al. | 174/138 F |
| 3,838,213 | 9/1974 | Georgopulos et al. | 178/46 X |
| 3,879,575 | 4/1975 | Dobbin et al. | 174/92 |
| 3,916,086 | 10/1975 | Gillemot et al. | 174/93 |
| 4,186,986 | 2/1980 | Shoemaker | 339/114 |
| 4,262,167 | 4/1981 | Bossard et al. | 174/92 |
| 4,337,374 | 6/1982 | Smith | 174/138 F |
| 4,451,696 | 5/1984 | Beinhaur | 174/92 |
| 4,501,927 | 2/1985 | Sievert | 174/93 |
| 4,610,738 | 9/1986 | Jervis | 156/49 |
| 4,721,830 | 1/1988 | Dagan et al. | 174/41 |
| 4,810,829 | 3/1989 | Rutenbeck et al. | 174/41 |
| 4,830,688 | 5/1989 | Staral | 156/48 |
| 4,849,580 | 7/1989 | Reuter | 174/92 |
| 4,879,436 | 11/1989 | Braham | 174/92 |
| 4,909,756 | 3/1990 | Jervis | 439/521 |
| 4,935,582 | 6/1990 | Calligaris | 174/92 |
| 4,942,270 | 7/1990 | Gamarra | 174/93 |
| 4,963,700 | 10/1990 | Olsen et al. | 174/138 F |
| 4,972,167 | 11/1990 | Fujioka | 336/92 |
| 4,998,894 | 3/1991 | Gronvall | 439/521 |
| 5,001,300 | 3/1991 | Messelhi | 174/87 |
| 5,135,409 | 8/1992 | Thompson | 439/367 |
| 5,173,573 | 12/1992 | Jervis | 174/138 F |
| 5,191,172 | 3/1993 | Garganese | 174/74 A |
| 5,217,387 | 6/1993 | Hull et al. | 439/367 |
| 5,226,837 | 7/1993 | Cinibulk et al. | 439/521 |
| 5,245,133 | 9/1993 | DeCarlo et al. | 174/93 |
| 5,347,084 | 9/1994 | Roney et al. | 174/92 |
| 5,373,277 | 12/1994 | Naito | 336/92 X |
| 5,387,763 | 2/1995 | Messelhi | 174/92 |
| 5,397,859 | 3/1995 | Robertson et al. | 174/92 |
| 5,427,270 | 6/1995 | Patterson | 220/250 X |

FOREIGN PATENT DOCUMENTS

| | | |
|---|---|---|
| 2103353 | 12/1992 | Canada . |
| 2134312 | 11/1995 | Canada . |

*Primary Examiner*—Kristine L. Kincaid
*Assistant Examiner*—Chau N. Nguyen
*Attorney, Agent, or Firm*—Victor E. Libert

[57] ABSTRACT

An enclosure for a cable splice assembly has an elongated tubular casing, within which the cable splice assembly is enclosed, and end walls, at least one of which has an orifice therein through which the cable passes. The tubular casing comprises a first section and a second section which are joined by an integral hinge, and has a latch for retaining the first and second sections together in a closed position. The casing preferably has at least one projection therein juxtaposed to each of the end walls, the projections being spaced apart by a distance that is greater than the length of the cable splice assembly in order to retain the cable splice assembly spaced away from the end walls. A water repellent gel is contained within the casing and the enclosure is freely rotatable around the cable splice assembly.

21 Claims, 3 Drawing Sheets

ENCLOSURE FOR CABLE SPLICE ASSEMBLY

FIELD OF THE INVENTION

The present invention relates to an enclosure for a cable splice assembly of the type used in the cable television, electronic, electrical, telecommunications and related industries. Such enclosures are used to protect the cable splice assembly from the environment, especially moisture in the environment. In particular, the enclosure is rotatable about the cable splice assembly and contains a water-proofing compound that coats and encompasses the cable splice assembly on rotation of the enclosure.

BACKGROUND OF THE INVENTION

In many areas, it is common for cable to have splices or joins, referred to herein as splices, at locations outside of the building that is being serviced. In particular, the respective telephone, cable, telecommunications or related companies will frequently bring their service to a junction box or other central location from which the telephone, cable television or other service is fed into a building, particularly a residential building. In some instances, the cables involved remain underground and in other instances, the cables are totally or partially located above ground. In any event, there may be splices within the cable, sometimes made during initial installation of the cable, but normally made during alterations to the cable, all of which result in the presence of cable splice assemblies.

The cable splice assemblies in telephone or television cables, or the like, must be protected from the environment, particularly the effects of moisture, rain, snow, pollution and the like. Thus, it is known to cover the cable splice assemblies with an enclosure. An example of an enclosure is given in U.S. Pat. No. 3,163,302 of C. J. Wochner et al which describes a hinged casing adapted to enclose the cable splice assembly and to hold the cable in position using a series of partitions and abutments. U.S. Pat. No. 4,501,927 of J. A. Siebert describes an enclosure having a protective sleeve and two toroidal sealing rings. Canadian 2 134 312 of J. W. Robertson et al describes an enclosure having a plurality of embossments and flanges for retention of the cable.

With enclosures, there is always the concern that an adequate protection has been provided against the environment, particularly moisture. Moreover, enclosures should be capable of being installed quickly by an operator, and in a manner that provides protection against moisture.

SUMMARY OF THE INVENTION

It has now been found that enclosures for cable splice assemblies may be obtained which are rapidly installable and rotatable around the cable to ensure that water repellent gel contained therein is coated around the cable splice assembly.

According, the present invention provides an enclosure for cable joined by a cable splice assembly, comprising:

(a) an elongated tubular casing to enclose said cable splice assembly, said casing having end walls at least one of which has an orifice therein to accommodate said cable, the casing being formed of a first section and a second section that are jointed by an integral hinge;

(b) said casing having a latch for retaining said first and second sections in a closed position; and (c) water repellent gel within said casing, said casing being formed from an insulating polymer and said enclosure being rotatable around such cable splice assembly.

In a preferred embodiment of the invention, the casing has one or more projection therein juxtaposed to said end walls having an orifice therein, said projections retaining said cable splice assembly spaced away from such end walls having an orifice therein.

In a further preferred embodiment of the enclosure of the present invention, each of said end walls of said casing has an orifice therein to accommodate said cable, the casing being formed of a first section and a second section that are joined by a longitudinal integral hinge extending between said end walls.

In another preferred embodiment of the present invention, one of the end walls of the casing has an orifice therein to accommodate two of said cables and the other of said end walls has a integral hinge joining said first section to said second section.

In yet another preferred embodiment, one of the end walls of the casing has an orifice therein to accommodate two of said cables, the casing being formed of a first section and a second section with a longitudinal integral hinge therebetween.

In another embodiment, the latch is a re-openable latch.

In a further embodiment, the polymer is a thermoplastic polymer, especially a polyolefin.

In a still further embodiment, the enclosure is symmetrical about its central axis.

BRIEF DESCRIPTION OF THE DRAWINGS

The present invention will be illustrated with reference to the embodiments shown in the drawings in which.

DETAILED DESCRIPTION OF THE INVENTION

Figure 1:
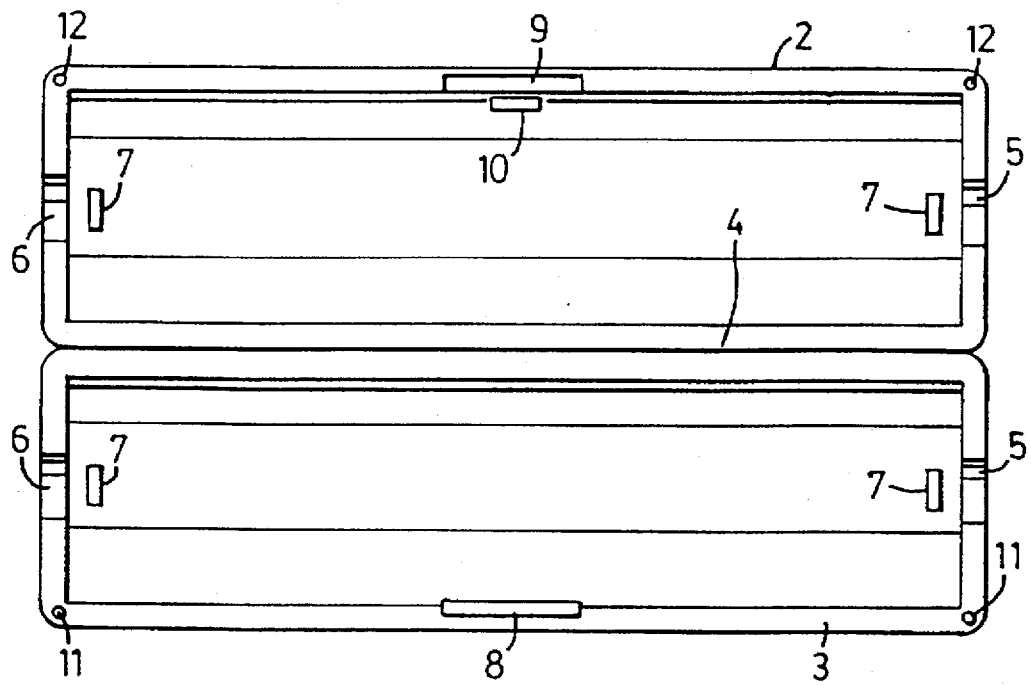
FIG. 1 is a schematic representation of a plan view of an enclosure comprising an embodiment of the present invention.

FIG. 1 shows an enclosure 1 having an upper casing 2 and a lower casing 3, also referred to herein as a first section and a second section of the enclosure. Although the casings are referred to herein as upper casing 2 and lower casing 3, it is to be understood that this is for convenience in referring to the drawing, as the casing has no upper or lower part per se. Furthermore, as discussed herein, in preferred embodiments the casing is symmetrical about its central axis. Upper casing 2 and lower casing 3 i.e. the first section and second section, form an elongated tubular casing on closure.

Upper casing 2 and lower casing 3 are joined by longitudinal hinge 4. Longitudinal hinge 4 is integral with both upper casing 2 and lower casing 3 and extends for the full length of such casings. It is preferred that longitudinal hinge 4 be a hinge of a type known as a coined hinge, also known as a living hinge, that is formed integrally with the formation of the casings.

Upper casing 2 and lower casing 3 are shown as having cable orifice 5 formed at one end thereof in end walls 5a and cable orifice 5 formed at the opposite end thereof in end walls 6a, each of the cable orifices being partly in upper casing 2 and partly in lower casing 3, and forming on closure of enclosure 1.

Figure 2:
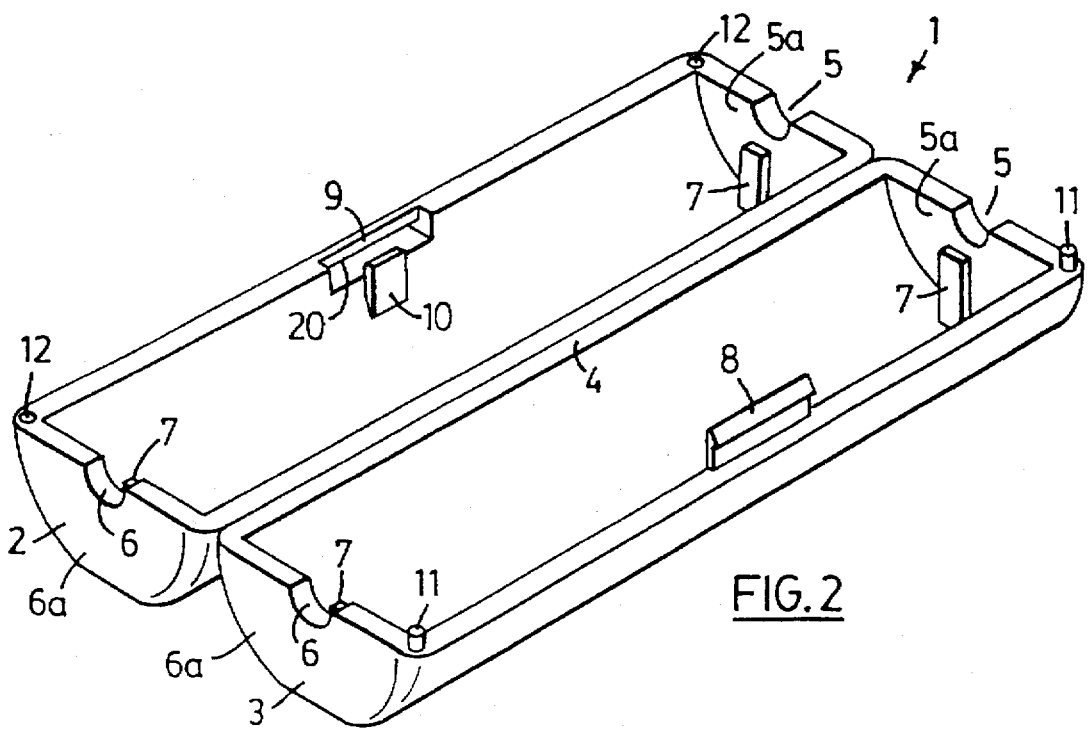
FIG. 2 is an schematic representation of a perspective view of the enclosure.

Projections 7 are shown at each end of both upper casing 2 and lower casing 3, as more clearly seen in FIG. 2.

Lower casing 3 is shown as having male latch 8, and upper casing 2 is shown having a complementary female latch recess 9. On closing, male latch 8 locks in latch slot 20 located within female latch recess 9. Lock guard 10 is located juxtaposed to female latch recess 9, to prevent male latch 8 from being pushed too far inward on opening.

Lower casing 3 is shown as having guide projections 11 at each end thereof, and upper casing 2 is shown as having complementary guide orifices 12. Such guide projections and guide orifices are more clearly seen in FIG. 2.

FIG. 2 shows a perspective view of enclosure 1. FIG. 2 more clearly shows projections 7 at opposite ends of each of upper casing 2 and lower casing 3. FIG. 1 and FIG. 2 show projections 7 at each end of upper casing 2 and each end of lower casing 3, which is preferred for convenience as it allows a cable splice assembly to be inserted in the desired position in either upper casing 2 or lower casing 3. Nonetheless, but less preferred, it is believed that only one projection is required at each end of the enclosure. For instance, upper casing 2 could have projections at each end thereof, and lower casing 3 could have projections at neither end thereof. While additional projections could be used, it is believed that it is not necessary to do so.

Figure 3:
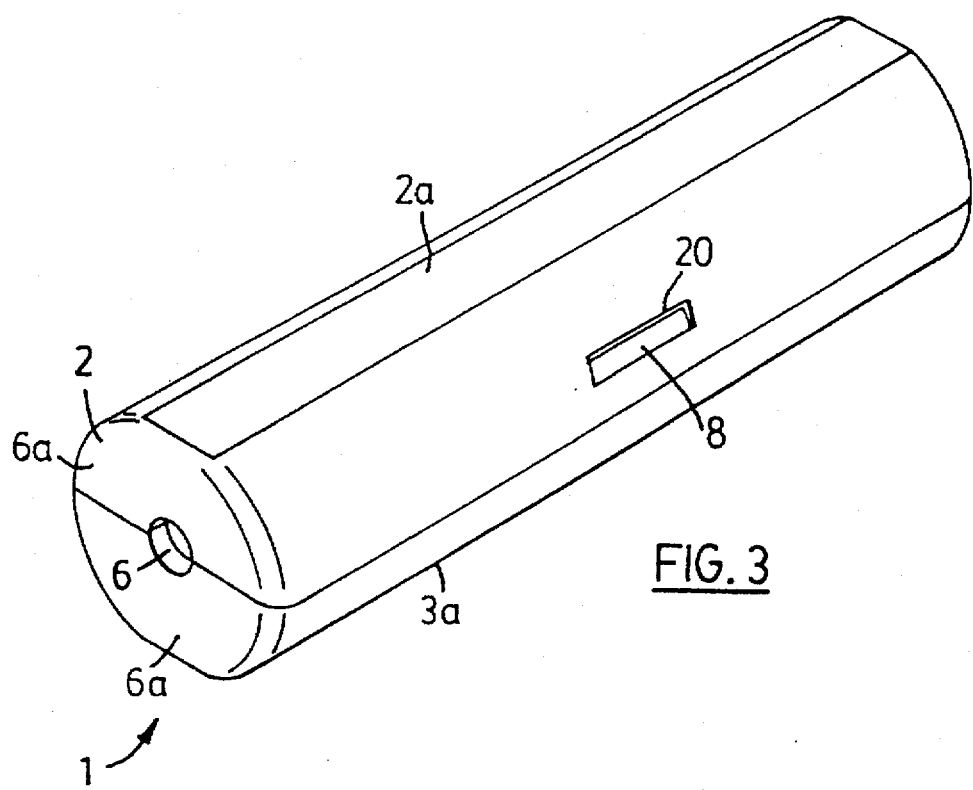
FIG. 3 is a schematic representation of the enclosure in a closed position.

FIG. 3 shows enclosure 1 in a closed position, with part of male latch 8 extending through latch slot 20, thereby holding upper casing 2 and lower casing 3 in a closed position. Cable orifice 6 is shown in the end of enclosure 1. It will be noted that each of upper casing 2 and lower casing 3 is shown as being essentially circular in part and having flattened sides 2a and 3a on opposed locations of upper casing 2 and lower casing 3. Such flattened sides 2a and 3a are preferred and serve at least two purposes, firstly for placement of logos, product identification codes or the like and secondly such that enclosure 1 will tend to lie flat against a wall or other surface when used above ground.

Figure 4:
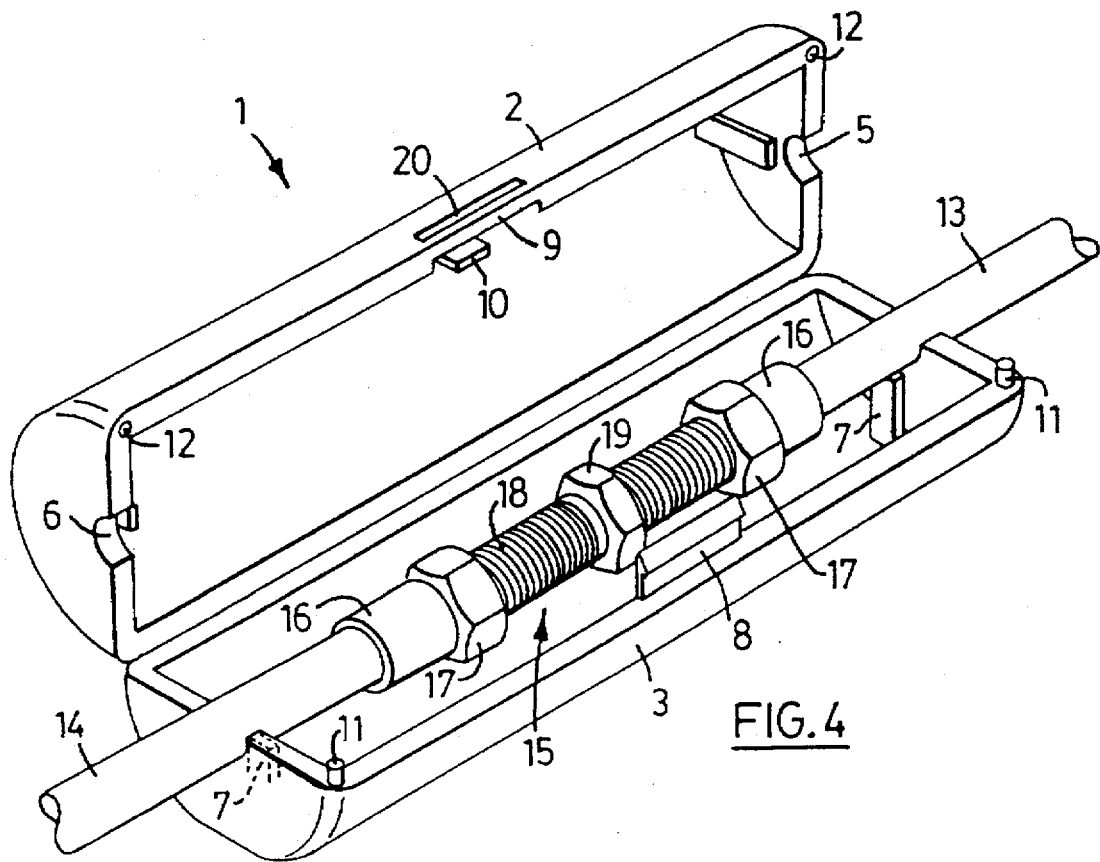
FIG. 4 is a perspective view of the enclosure in the open position with a coaxial cable and cable splice assembly located therein.

FIG. 4 shows enclosure 1 having cables and cable splice assembly therein. Cables 13 and 14 are shown as entering opposite ends of lower casing 3, with cable 13 laying in cable orifice 5 and cable 14 laying in cable orifice 6; it is understood that cables 13 and 14 could similarly be shown as being in upper casing 2, as there is no upper and lower casing per se, as discussed above. Cable 13 is shown as being joined to cable 14 by a cable splice assembly generally indicated by 15.

Cable splice assembly 15 is shown as being comprised of cable end 16 on each of cables 13 and 14. In the embodiment shown, cable end 16 has cable end nut 17 on the end thereof. Intermediate between cable end 16 and cable end nut 17 on each side of cable 13 and cable 14 is threaded junction 18, which has junction nut 19 integral therewith. As will be understood by persons skilled in the art, junction 18 effects the splicing or electrical connection between cables 13 and 14. Each cable end nut 17 has been screwed onto threaded junction 18 from opposite ends thereof and tightened to form cable splice assembly 15, and hence join cable 13 to cable 14.

It is to be understood that other types of cable splice assemblies, i.e., other than that specifically shown in FIG. 4, may be used in the enclosure of the present invention.

Projections 7 are shown as located beneath each of cable 13 and cable 14 and in a juxtaposed relation thereto. Furthermore, projections 7 are shown as being in proximity to but spaced apart from each cable end 16 thereby permitting some lateral movement of cable splice assembly 15 within enclosure 1. It is understood that projections 7 are positioned and of a size such that, while cable splice assembly 15 may exhibit some lateral movement within enclosure 1, each cable end 16 would contact projection 7 on such lateral movement and not come in proximity to cable orifice 5 or cable orifice 6. Thus, cable splice assembly 15 is maintained by projections 7 in a spaced apart relationship to each of cable orifice 5 and cable orifice 6.

It is understood that a water repellent gel would be located within upper casing 2 and/or lower casing 3, but such gel has not been shown in the drawings for clarity.

In operation, cables such as cable 13 and cable 14 are connected using a cable splice assembly 15. An enclosure 1, which would normally be in a package and contain water repellent gel therein, is removed from the package and opened. In some embodiments of the invention, it is possible to open enclosure 1 by applying pressure to opposite sides of the latch 1, i.e., applying pressure to each of upper casing 2 and lower casing 3 in the proximity of the latch. Alternatively, and more commonly, in the enclosure may be opened by other means, e.g., using a screw driver or other object to release male latch 8 from female recess 9 and especially latch slot 20. Cable splice assembly 15 is then placed into either upper casing 2 or lower casing 3, such that cable splice assembly 15 is intermediate between projections 7 at opposite ends of the casing. Enclosure 1 is then closed and rotated about cable splice assembly 15.

It is intended that enclosure 1 be freely rotatable about cable splice assembly 15. It is suggested that enclosure 1 be rotated for one or more revolutions in at least one direction, preferably one or more revolutions in both directions. One revolution in each direction is generally believed to be adequate. This ability to rotate enclosure 1 about cable splice assembly 15 is an essential feature of the present invention, to facilitate distribution of the gel around cable splice assembly 15. It is believed that rotation of enclosure 1 results in a good covering of gel around cable splice assembly 15, with minimal bubbles or other areas where cable splice assembly 15 is not coated with gel, thereby essentially eliminating areas where moisture can seep into the enclosure and accumulate near or on the cable splice assembly, and potentially cause failure or other problems with the cable splice assembly.

The amount of water repellant gel placed within upper casing 2 and/or lower casing 3 should be such that on insertion of cable splice assembly 15 and the accompanying cables and closure of enclosure 1, a small amount of water repellent gel may be forced out of each of cable orifice 5 and cable orifice 6, and/or possibly at other locations e.g. between the junction of upper casing 2 and lower casing 3. Normally such excess of water repellent gel is removed e.g. with a cloth or the like. At that stage, installation of enclosure 1 about cable splice assembly 15 is complete.

In operation, installation of enclosure 1 about a cable splice assembly 15 may be accomplished in a matter of seconds, as it merely requires placing cable splice assembly 15 within one of upper casing 2 or lower casing 3, closing with a snap closure such that enclosure 1 encompasses cable splice assembly 15, followed by a quick rotation of enclosure 1 about the cable in one or both directions, preferably both directions, to distribute the gel around the cable splice assembly. No further action is required by the person installing the enclosure about the cable splice assembly. If necessary, enclosure 1 could be removed from a cable splice assembly 15 at some subsequent time, and possibly even reused, especially if some additional water repellent gel was placed in the removed enclosure 1.

Figure 5:
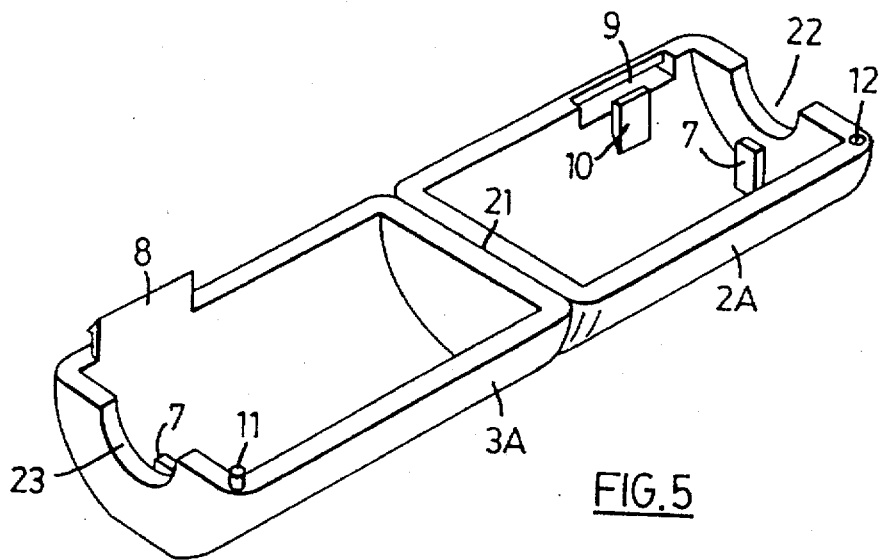
FIG. 5 is a schematic representation of a second embodiment having an enclosure having the hinge at one end thereof.

FIG. 5 shows an alternate enclosure in which hinge 21 is shown as being located at one end of upper casing 2A and lower casing 3A. Thus, instead of the hinge being along the length of the enclosure, the hinge is across one of the two ends of the enclosure. Upper casing 2A has a dual cable orifice 22 located at the end opposed to hinge 21, and likewise lower casing 3A has a dual cable orifice 23 at the end opposed to hinge 21. Dual cable orifices 22 and 23 are of a larger dimension than cable orifices 5 and 6 shown in the previous drawings, as cable orifices 22 and 23 are intended to accommodate two cables, one being in effect an inlet cable and the other being in effect an outlet cable. Male latch 8 and female latch recess 9 are shown as being cooperatively located on one side of lower casing 3A and upper casing 2A respectively, with guide projections 11 and guide orifices 12 being located on the opposed sides of upper casing 2A and lower casing 3A. As shown in FIG. 5, projection 7, which is optional in this embodiment, is shown on the end of each of upper casing 2A and lower casing 3A adjacent cable orifices 22 and 23.

While the orifices 22 and 23 have been referred to as dual cable orifices, the cable entering the enclosure may be a single cable in external appearance, but have a multitude of cables therein.

In operation, the inlet and outlet cables would be joined into a cable splice assembly suitable for connecting two cables that lie in parallel to each other. Thus, the cable splice assembly would be of a type where the inlet cable and the outlet cable were located on the same side of the splice, with the splice assembly having a suitable connection means within the splice assembly. Such cable splice assemblies are known. In other respects, the enclosure of FIG. 5 would operate in the same manner as the enclosure of FIGS. 1-4.

Figure 6:
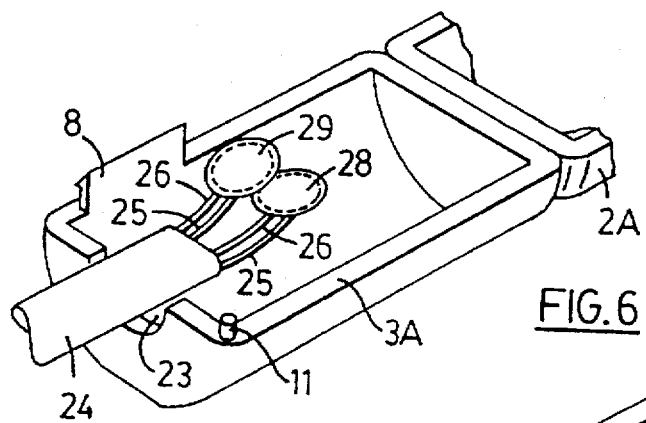
FIG. 6 is a schematic representation of the enclosure of FIG. 5 with a cable splice assembly located therein.

FIG. 6 shows a cable 24 entering into the enclosure through dual cable orifice 23. Cable 24 has two pairs of wires passing out the end thereof, each pair of wires having a first wire 25 and a second wire 26. Wires 25 and 26 enter splice assemblies, indicated by 28 and 29. Only two pairs of wires are shown, for clarity, but it is understood that cable 24 may have more pairs of wires, e.g., up to eight or more pairs of wires.

Figure 7:
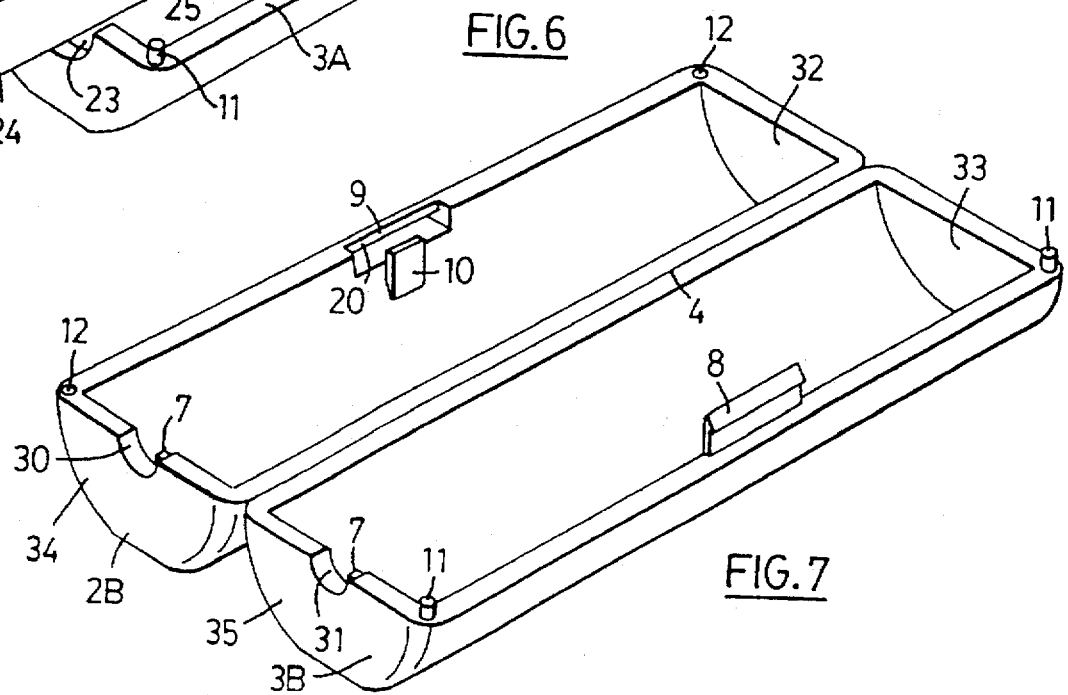
FIG. 7 is a schematic representation of another embodiment of the enclosure, similar to the embodiment of FIG. 5 but with a longitudinal hinge.

FIG. 7 shows an alternate embodiment of the enclosure of FIG. 2. Upper casing 2B and lower casing 3B have a longitudinal integral hinge 4 extending between end walls 32 and 34 of upper casing 2B and end walls 33 and 35 of lower casing 3B. End walls 34 and 34 have cable orifices 30 and 31 therein. However, end walls 32 and 33 do not have cable orifices i.e. they form a closed end on closure of the enclosure. Cable orifices 30 and 31 are intended to accommodate a cable in the same manner as the embodiment of FIGS. 5 and 6, and would have similar dimensions. The cable to be placed in the enclosure of FIG. 7 is exemplified by the type shown in FIG. 6.

It is understood that the enclosures of FIGS. 5 to 7, with cable installed, are rotatable and would be rotated after installation of the cable splice.

Water repellent gels of a type suitable for use in enclosure for cable splice assemblies are known. Such gels may be hydrocarbon gels e.g. polyolefin gels, or silicone gels. Examples of such gels include polyolefin or silicone dielectric compounds, especially dielectric compounds with low bleed factors, as such compounds have a reduced likelihood of leaking from the enclosure. Bleed factor is a measure of the seepage or flow of the compound out of the enclosure while in use. Such a factor will be understood by persons skilled in the art. Moreover, the gel needs to readily distribute around the cable splice assembly on rotation of the enclosure around the cable splice assembly, as will also be understood.

The polymer used to form the enclosure needs to be capable of exposure to the environment, especially sun, rain and cold, for a number of years without significant degradation, i.e., the enclosure needs to retain its integrity for the expected useful life of the cable splice assembly. Preferred polymers are thermoplastic polymers, for ease of fabrication, especially polyolefins. Preferred polymers are polyethylene and especially polypropylene. The polymers would normally contain antioxidants and UV stabilizers as will be understood by persons skilled in the art. In addition, the polymer will normally contain pigments, especially carbon black.

The present invention provides a simple and rapid way of installing and protecting a cable splice assembly for cables, as described above. Cable splice assemblies with the enclosure may remain outdoors, and be subjected to rain, snow, moisture, pollution or the like while still giving a high degree of protection to the cable splice assembly.

The enclosures particularly are intended to be used with coaxial cables for e.g. cable television, but may also be used with other types of cables of the electronic, electrical, television, telephone, telecommunications and similar industries.

The present invention is illustrated by the following example.

EXAMPLE I

An enclosure as shown in FIGS. 1-4 was manufactured from polypropylene containing carbon black pigment. The enclosure had an overall length of 8 cm, with projections 7 being spaced apart by 7 cm and spaced from the respective end walls 5a, 6a of the enclosure by about 0.3 cm. Each casing has a width of 2 cm. The enclosure was circular in cross-section, but with opposed flattened sides 2a, 3a, as discussed herein.

The enclosure accommodated a cable splice assembly on cable for cable television. The cable splice assembly had an overall length of 6.7 cm, and thus fitted between the projections with some lateral movement. The projections extended from the casing to be juxtaposed to the cable, being of sufficient length to prevent movement of the cable splice assembly to the end walls 5a, 6a. The enclosure, when closed was freely rotatable about the cable.

The enclosure contained sufficient water repellent gel to exude a small amount through the cable orifices when the enclosure was closed about a cable and cable splice assembly. The gel was a silicone dielectric compound with a low bleed factor. This gel is viscous, and does not flow out of the enclosure, but readily coats the cable splice assembly on rotation of the enclosure about the cable splice assembly.

It is understood that the enclosures may be manufactured in dimensions other than those described in this example, and to accommodate cable splice assemblies of different shapes and dimensions from that disclosed in this example.

I claim:

1. An enclosure for cable joined by a cable splice assembly, comprising:
   (a) an elongated tubular casing to enclose such cable splice assembly, said casing having end walls at least one of which has an orifice therein to accommodate such cable, the casing being formed of a first section and a second section that are joined by an integral hinge;
   (b) said casing having a latch for retaining said first and second sections in a closed position; and
   (c) a water repellent gel within said casing, said casing being formed from an insulating polymer and said enclosure being rotatable around such cable splice assembly.

2. The enclosure of claim 1 in which said casing has one or more projections therein juxtaposed to said at least one end wall having an orifice therein, said projections retaining such cable splice assembly spaced away from said at least one end wall having an orifice therein.

3. The enclosure of claim 2 in which each of said end walls of said casing has an orifice therein to accommodate such cable, the casing being formed of said first section and said second section that are joined by a longitudinal integral hinge extending between said end walls, said projections being spaced apart from each other by a distance that is greater than the length of such cable splice assembly.

4. The enclosure of claim 1 or claim 2 in which the latch is a re-openable latch.

5. The enclosure of claim 1 or claim 2 in which the polymer is a thermoplastic polymer.

6. The enclosure of claim 5 in which the polymer is a polyolefin.

7. The enclosure of claim 6 in which the polymer is polypropylene.

8. The enclosure of claim 1 or claim 2 in which the enclosure has a central axis and is symmetrical about said central axis.

9. The enclosure of claim 2 in which the first section and the second section of the casing each has at least one of said projections at each end thereof.

10. The enclosure of claim 1 or claim 2 in which the water repellent gel has a low bleed factor.

11. The enclosure of claim 1 or claim 2 in which said orifice of said at least one end wall is dimensioned to accommodate two lengths of such cable and said integral hinge joining said first section to said second section is disposed at the other of said end walls.

12. The enclosure of claim 11 in which the latch is a re-openable latch.

13. The enclosure of claim 11 in which the polymer is a thermoplastic polymer.

14. The enclosure of claim 13 in which the polymer is a polyolefin.

15. The enclosure of claim 14 in which the polymer is a polypropylene.

16. The enclosure of claim 11 in which the enclosure has a central axis and is symmetrical about the central axis.

17. The enclosure of claim 2 in which the first section and the second section of the casing each has at least one of said projections at each end thereof.

18. The enclosure of claim 11 in which the water repellent gel has a low bleed factor.

19. The enclosure of claim 1 or claim 2 in which said orifice of said at least one end wall is dimensioned to accommodate two lengths of such cable and said integral hinge extends longitudinally between the first section and the second section.

20. The enclosure of claim 1 in which said and walls are located at each end of the elongated tubular casing and have a respective orifice therein, and further comprising two or more projections which are spaced apart from each other by a distance greater than the length of such cable splice assembly.

21. The enclosure of claim 11 wherein said end wall at which said integral hinge is disposed does not have an orifice formed therein.

* * * * *

UNITED STATES PATENT AND TRADEMARK OFFICE
CERTIFICATE OF CORRECTION

PATENT NO. : 5,684,274
DATED : November 4, 1997
INVENTOR(S) : Robert J. McLeod

It is certified that error appears in the above-indentified patent and that said Letters Patent is hereby corrected as shown below:

In column 1, line 34, change "3,163,302" to read --3,183,302--.

In column 2, line 2, change "projection" to read --projections--.

In column 2, line 35, change "is an" to read --is a--.

In column 2, line 62, change "i.e." to read --, i.e.,--.

In column 3, line 6, change "cable orifice 5" to read --cable orifice 6--.

In column 3, line 8, change "on" to read --upon--.

In column 3, line 60, change "each side of" to read --each of--.

In column 4, line 12, change "projection 7" to read --projections 7--.

In column 4, line 26, change "latch 1," to read --latch,--.

In column 4, line 28, delete "in".

In column 4, line 57, change "e.g." to read --, e.g.,--.

In column 4, line 59, change "e.g." to read --, e.g.,--.

In column 5, line 27, change "projection 7" to read --projections 7--.

In column 5, line 55, change "34 and 34" to read --34 and 35--.

In column 5, line 57, change "i.e." to read --, i.e.,--.

UNITED STATES PATENT AND TRADEMARK OFFICE
CERTIFICATE OF CORRECTION

PATENT NO. : 5,684,274
DATED : November 4, 1997
INVENTOR(S) : Robert J. McLeod

It is certified that error appears in the above-indentified patent and that said Letters Patent is hereby corrected as shown below:

In column 6, line 1, change "e.g." to read --, e.g.,--.

In column 6, line 31, change "e.g." to read --, e.g.,--.

In column 6, line 64, change "It is understood" to read --It is to be understood--.

In column 8, line 29, change "said and walls" to read --said end walls--.

Signed and Sealed this

Twelfth Day of May, 1998

Attest:

BRUCE LEHMAN

*Attesting Officer*   *Commissioner of Patents and Trademarks*